United States Patent
Stoll

(10) Patent No.: US 12,547,864 B2
(45) Date of Patent: Feb. 10, 2026

(54) METHOD AND PRODUCT FOR SYNTHESISING PRINT DATA AND FOR PROVIDING THE DATA TO A PRINTER

(71) Applicant: Durst Group AG, Brixen (IT)

(72) Inventor: Thomas Stoll, Brixen (IT)

(73) Assignee: DURST GROUP AG, Brixen (IT)

( * ) Notice: Subject to any disclaimer, the term of this patent is extended or adjusted under 35 U.S.C. 154(b) by 195 days.

(21) Appl. No.: 18/681,303

(22) PCT Filed: Sep. 9, 2022

(86) PCT No.: PCT/EP2022/025420
§ 371 (c)(1),
(2) Date: Feb. 5, 2024

(87) PCT Pub. No.: WO2023/066512
PCT Pub. Date: Apr. 27, 2023

(65) Prior Publication Data
US 2025/0322193 A1    Oct. 16, 2025

(30) Foreign Application Priority Data

Oct. 18, 2021    (IT) .................. 102021000026552

(51) Int. Cl.
*G06K 15/02* (2006.01)
*G06K 15/10* (2006.01)
(52) U.S. Cl.
CPC ....... *G06K 15/1836* (2013.01); *G06K 15/102* (2013.01); *G06K 15/1813* (2013.01)
(58) Field of Classification Search
CPC ........... G06K 15/1836; G06K 15/1813; G06K 15/102
See application file for complete search history.

(56) References Cited

U.S. PATENT DOCUMENTS

| 6,091,506 | A * | 7/2000 | Payne | G06K 15/02 358/1.14 |
| 7,301,669 | B1 * | 11/2007 | Yamada | G06K 15/00 358/1.9 |
| 2009/0046105 | A1 | 2/2009 | Bergland et al. | |

FOREIGN PATENT DOCUMENTS

DE    69130132 T2    1/1999

OTHER PUBLICATIONS

Written Opinion (WO) for PCT/EP2022/025420 mailed Dec. 23, 2022 (19 pages).
International Preliminary Report on Patentability (IPER) mailed Apr. 23, 2024 (21 pages).
International Search Report (ISR) for PCT/EP2022/025420 mailed Dec. 23, 2022 (7 pages).
Tahir Rehan et al. "ACAP at the Edge With the Versal AI Edge Series" Sep. 6, 2021, p. 1-17, XP055927324 (whole document).

* cited by examiner

*Primary Examiner* — Ibrahim Siddo
(74) *Attorney, Agent, or Firm* — Jason A. Smith; Shumaker, Loop & Kendrick, LLP

(57) ABSTRACT

A method, preferably a computer-implemented method, for synthesizing m-bit print data and for providing the data to a printer, the method including: a) inputting object-based data of at least one image in the form of a page description language into a raster image processor having at least one system-on-chip comprising a plurality of processors; b) converting the object-based data into n-bit pixel data of each color channel of a first target color space with a predefined image resolution by providing the object-based data to some or to all of the plurality of processors and processing the data in parallel by means of the processors; c) converting the n-bit pixel data of each color channel into m-bit print data of each color channel of a second target color space by means of at least one dithering algorithm and storing or buffering the m-bit print data in an output memory; d) providing the m-bit print data to the printer and printing on at least one print medium by means of the printer. The system-on-chip is provided as a programmable system-on-chip and the processors are provided as single-instruction-multiple-data-capable or multiple-instruction-multiple-data-capable processors each having at least one vector-based arithmetic logic unit, which vector-based arithmetic logic units have each been configured in such a way that, during the parallel processing according to step b), a plurality of object-based data entering the relevant arithmetic logic unit in parallel, each having a bit width of x-bit, is converted using a predefined set of arithmetic operations into pixel data having a bit width of y-bit, which is greater than the bit width of x-bit, wherein subsequently the y-bit pixel data in the form of a pixel matrix consisting of an integer number of n-bit pixel data is stored or buffered in a pixel memory.

34 Claims, No Drawings

METHOD AND PRODUCT FOR SYNTHESISING PRINT DATA AND FOR PROVIDING THE DATA TO A PRINTER

TECHNICAL FIELD AND BACKGROUND

The present invention relates to a method and a product each for synthesizing print data from object-based data in the form of a page description language and for providing the same to a printer.

At this point, some terms used in this description should be defined in advance.

When this description refers to object-based data in the form of a page description language, this refers to objects and their properties from which an image is constructed. The term object is understood to mean a graphical primitive, a pixel field, a shading, a transparency or a font. In this application, elementary one- or two-dimensional geometric shapes are referred to as graphical primitives. A graphical primitive is described, among other things, by one or more vectors. A two-dimensional geometric shape is, for example, a circle, an ellipse or a polygon, such as a rectangle, a square or a triangle. On the other hand, a one-dimensional geometric shape is, for example, a point, i.e. a pixel, a line or a polynomial draw. When we talk about properties of objects in the context of this description, this refers to the position of the object in the image and, if applicable, its color, line width, fill pattern and other data that determine its appearance.

The term programmable system-on-chip, hereinafter also referred to as PSoC, means in this description that it is possible to program and reprogram, i.e. design and redesign, the system-on-chip, in particular its functional modules, both at the hardware level and at the software level.

Methods for converting object-based data of vector graphics into pixel data of raster graphics typically represent a first step towards the synthesis of print data on the basis of which a printer can print on a print medium. Most of these methods today make use of a raster graphics processor, which has been designed in such a way that a complete conversion of a vector graphic into a raster graphic is usually required before the resulting pixel graphic can be dithered using a predetermined algorithm and consequently passed to a printer as a dithered print graphic. This is certainly the case when it comes to complex vector graphics.

Such raster graphics processors are inexpensive to purchase but can only process incoming data ineffectively and therefore laboriously, so they are only suitable if a single image can and should be printed with a printer in such a large print run that there is enough time available for rasterization another vector graphic.

A problem that causes the slow conversion speed, i.e. rasterization speed, is the fact that such methods use a raster graphics processor with a processor that can only carry out the complex rasterization in a serial manner.

In order to enable a sufficiently high level of flexibility with regard to short-term changes when preparing print jobs, it is very important that the conversion of object-based data from a vector graphic into a pixel graphic can be carried out as quickly as possible.

The reason why today, on single-pass printers with a relatively high print resolution, most images to be printed must be rasterized well in advance is that the printer consumes this print image data faster than a typical raster graphics processor can process the vector graphics underlying this print image data. This means there is no flexibility with regard to short-term changes in the preparation of print jobs. This is particularly true when print jobs with a high proportion of varying images have to be converted, where no image is identical to any other image.

Typical high-performance printing machines, i.e. single-pass inkjet printers today consume print data at rates of at least 100 Gbit/s, but often more than 300 Gbit/s or more than 400 Gbit/s, and the trend is increasing. For single-pass inkjet printers, which are intended to be able to print on a print medium with a width of two meters at a speed of five meters per second at a resolution of 1200×1200 DPI without stopping production, data output rates of around 1600 Gbit/sec are required when converting vector graphics to raster graphics if print jobs contain a high proportion of varying images and the conversion is to take place essentially at the same time as the printing process.

An additional challenge with most common raster graphics processors is providing enough storage space.

For a single-pass printer that is 2.6 m wide and prints with 2400 DPI resolution, approximately 16 GByte per $m^2$ of storage capacity is required. For example, if print data is to be provided in advance for 24-hour operation of the printer, it must be ensured that storage capacity is made available for a data volume of around 8 petabytes of print data per day. Nowadays, several storage cabinets are required for this. With most serial raster graphics processors currently available on the market several days are to be planned with respect to rasterization such a large amount of data.

In the context of this description, a single-pass printer is understood to mean a printing machine with a printing module for printing at least one printing medium, in which in the operating mode of the printing machine the printing medium or the respective printing media is or are continuously moved and the printing module for each area of the printing medium or the respective print media it sees, it sees it only once and the printing module is arranged stationary.

A method of synthesizing print data and providing it to a single-pass printer, which has been used very rarely in the recent past, involves rapid conversion of the object-based data into 8-bit pixel data using a novel high-performance raster graphics processor that outputs rasterized pixel data at an output rate of more than 800 Gbit/sec, achieved by providing the object-based data to a large number of processors and processing them in parallel, i.e. at the same time, by delegating each single image from a group of several images to a respective different processor of the raster graphics processor for conversion, so that multiple processors process different images in parallel but in a serial manner.

This prior art method includes the following steps: (A) inputting object-based data from multiple images in the form of a page description language into a raster graphics processor having at least one system-on-chip comprising multiple processors; (B) converting the object-based data into 8-bit pixel data of each color channel of a first target color space with a specified image resolution by providing the object-based data to the processors and processing them in parallel with the processors; (C) converting the 8-bit pixel data of each color channel into 1-bit print data of each color channel of a second target color space with at least one dithering algorithm and storing the 1-bit print data in an output memory and (D) Providing the print data to the printer and printing at least one print medium with the printer.

The raster graphics processor with a large number of processors that enables such a method is suitable for solving the above-mentioned disadvantage of the slow raster speed. However, this requires a disproportionate amount of space, as several server racks are required in several server cabinets, which, due to their high weight, can only be moved with a loading device, typically a forklift. It is also prone to failure, which means it is unreliable, and it is costly and is therefore not particularly marketable. These high-performance raster graphics processors currently typically cost between four hundred thousand euros and one million euros to purchase, depending on the version.

SUMMARY

There is therefore a need for a method and also for a product for converting object-based data into pixel data, which enables effective processing of object-based data with a raster graphics processor of simple and inexpensive design.

The present invention is therefore based on the object of specifying a method and a product for converting object-based data into pixel data, which enables effective processing of object-based data with a raster graphics processor of a simple and cost-effective design, thereby improving the overall process effectiveness and also the overall system effectiveness in terms of availability, performance and price. Overall equipment effectiveness is a business indicator that can be used to measure the productivity and any losses of technical systems.

DETAILED DESCRIPTION

According to the invention, the object is achieved with a method that includes the features of claim 1 and with a product that includes the features of claim 22. The respective subclaims relate to further advantageous and, if necessary, additional inventive embodiments.

The invention is based on the idea of providing a raster graphics processor with at least one programmable system-on-chip comprising several single-instruction-multiple-data-capable or multiple-instruction-multiple-data-capable processors, each with at least one vector-based arithmetic logic unit, which vector-based arithmetic logic units were each configured in such a way that in order to process object-based data in parallel with the processors, several into the respective arithmetic logic unit parallel incoming object based data, each with a bit width of X-bit, based on a predetermined set of calculation operations are converted into pixel data with a bit width of Y-bit, which is larger than the bit width of X-bit whereby in the following the Y-bit pixel data are buffered and stored in a pixel memory in the form of a pixel matrix consisting of an integer number of N-bit pixel data.

For the sake of clarity, it is noted that when the term "processor", in particular the term "vector processor", is used as such in the invention or one of its preferred embodiments, a single-instruction-multiple-data-capable or multiple-instruction-capable-multiple-data-capable processor, in particular vector processor, of a programmable system-on-chip of the raster graphics processor is meant.

A method, preferably a computer-implemented method, for synthesizing M-bit print data and providing the same to at least one printer is known to include the following steps: (a) inputting object-based data of at least one image in the form of a page description language into a raster graphics processor with at least one system-on-chip comprising multiple processors; (b) converting the object-based data into N-bit pixel data of each color channel of a first target color space with a given image resolution by providing the object-based data to some or all of the plurality of processors and processing with the processors in parallel; (c) converting the N-bit pixel data of each color channel into M-bit print data of each color channel of a second target color space with at least one dithering algorithm and buffering or storing the M-bit print data in an output memory; (d) providing the M-bit print data to the printer and printing at least one print medium with the printer.

Accordingly, the method according to the invention is a method, preferably a computer-implemented method, for synthesizing M-bit print data and providing the same to at least one printer, comprising:

a) inputting object-based data of at least one image, preferably several images, in the form of a page description language in a raster graphics processor with at least one system-on-chip comprising several processors;

b) converting the object-based data into N-bit pixel data of each color channel of a first target color space with a specified image resolution by providing the object-based data to some or all of the plurality of processors and processing them in parallel with the processors;

c) converting the N-bit pixel data of each color channel into M-bit print data of each color channel of a second target color space with at least one dithering algorithm and buffering or storing the M-bit print data in an output memory;

d) Providing the M-bit print data to the at least one printer and printing at least one print medium with the printer.

According to the invention, the system-on-chip is provided as a programmable system-on-chip and the processors as single-instruction-multiple-data-capable or multiple-instruction-multiple-data-capable processors, each with at least one vector-based arithmetic logic unit, which vector-based arithmetic logic units were each configured in such a way that during parallel processing according to step b), several object-based data entering the respective arithmetic logic unit in parallel, i.e. simultaneously, each with a bit width of X-bit, using a predetermined set of calculation operations are converted into pixel data with a bit width of Y-bit, which is larger than the bit width of X-bit whereby in the following the Y-bit pixel data are buffered and stored in a pixel memory in the form of a pixel matrix consisting of an integer number of N-bit pixel data.

As a result, the PSoC is designed so that its processors have parallel access to the PSoC's pixel memory, which enables a high data access rate. In addition to the advantages mentioned above, the method according to the invention also offers the advantage that the method can be operated with low energy consumption despite high data processing rates, at least during the conversion.

As a result, the raster graphics processor can also be designed to be portable or is portable, and preferably even if it is designed to generate N-bit pixel data at a rate of at least 800 gigabit per second, preferably at least 2500 gigabit per second, according to step b) by providing the raster graphics processor with a sufficiently high number of programmable system-on-chips, each comprising a sufficient number of single-instruction-multiple-data-capable or multiple-instruction-multiple-data-capable processors, preferably vector processors. This is made possible because PSoCs are, by nature, extremely compact. For example, such a portable raster graphics processor can be realized by providing at least 8 "Adaptive Computer Acceleration Platforms" of the "Premium Series" type as PSoC from Xilinx Inc. As used herein, the term "portable" means that the raster graphics processor can be easily held and transported with one or both hands of a user. These further developments therefore offer the advantage that easier handling and mobility of the raster graphics processor according to the invention is and is made possible.

The single-instruction-multiple-data-capable or multiple-instruction-multiple-data-capable processor(s) can each be provided with multiple vector-based arithmetic logic units.

The single-instruction-multiple-data-capable or multiple-instruction-multiple-data-capable processors may be provided as single instruction multiple data capable or multiple instruction multiple data capable vector processors.

The object-based data may include object-based PDF data and/or object-based PostScript data, each in the form of a vector-based page description language.

According to a preferred embodiment, a subtractive color space is specified as the first target color space, which preferably includes at least the color channels cyan blue (C), magenta red (M), yellow (Y) and black (K), and a subtractive color space is specified as the second target space, which preferably includes at least the color channels cyan blue (C), magenta red (M), yellow (Y) and black (K), and in particular at least one of the color channels of a predetermined green and/or violet and/or orange.

According to a further preferred embodiment, the N-bit pixel data has a bit width of 8-/9-/10-/11-/12-/13-/14-/15- or 16-bit, preferably a bit width of 8-/16-/32- or 64-bit, in particular a bit width of 8 bit, and the M-bit print data has a bit width of 1-/2-/3- or 4-bit.

The slash "/" means "or". When speaking of 8-bit pixel data of a color channel of a first target color space in the context of this description, this means pixels with a color depth of one color channel of 8-bit, i.e. with a color gradation between 0 and 255.

When this description refers to 1-bit print data of a color channel of a second target color space, this means pixels with a color depth of the one color channel of 1 bit, i.e. with a color gradation of 0 and 1. With a corresponding binary printing mode, each pixel in a row of a print grid which is imagined to be on the print medium imaginary is applied either with no drop or with a drop of a color.

However, if, for example, 2-bit print data of a color channel of a second target color space is spoken of, this means pixels with a color depth of one color channel of 2-bit, i.e. with a color gradation of 0 to 3. In a corresponding grayscale mode, each pixel of a row of an imaginary print grid on the print medium is exposed either to no drop or to a combination drop, which is composed of k drops of one color, where it can be that k=1-3.

According to a further preferred embodiment, the X-bit pixel data have a bit width of 8-/16-/32- or 64-bit, preferably 8-bit and the Y-bit print data have a bit width of 16-/32-/64-/128-/256-/512-/1024-/2048- or 4096-bit, preferably 128-/256-/512-/1024-/2048- or 4096-bit.

Accordingly, in this preferred embodiment, the X-bit pixel data of all vector based arithmetric logic units have a bit width of 8-/16-/32- or 64-bit, preferably a bit width of 8-bit and the Y-bit print date of all vector based arithmetic logic units have a bit width of 16-/32-/64-/128-/256-/512-/1024-/2048- or 4096-bit preferably of 128-/256-/512-/1024-/2048- or 4096-bit so that the sum of the respective Y-bit print data of all vector-based arithmetic logic units corresponds to the sum of the respective bit widths of all vector-based arithmetic logic units, which sum preferably corresponds to a bit width of up to 1048576 bit.

According to a particularly preferred embodiment of the method according to the invention, the raster graphics processor was equipped with conversion modes R1 and R2, the conversion according to step b) taking place in one or more conversion cycles, a conversion cycle comprising the steps:
  e) determining an object group of objects to be converted image based on conversion progress;
  f) determining the computing effort R for each object from the object group in order to predict whether the corresponding required computing effort R exceeds a predetermined value S or falls below the value S, and categorizing the respective objects into type A if the computing effort falls below the value S, and in type B, when the computational effort exceeds the value S;
  g) start the conversion by
    i. if the object was categorized as type A, mode R1 is selected and the object is broken down into several independent re-vectorized objects according to mode R1 and the re-vectorized objects are provided to a predeterminable number of processors and with the processors according to step b) converted, which re-vectorized objects are partial objects of the object, which in total form the object;
    ii. if the object has been categorized as type B, mode R2 is selected and the object is converted to mode R2 without being broken down into several independent re-vectorized objects according to step b);

These further developments offer the advantage that the processing time of the object-based data of a single image can be reduced immensely through this stepped sequence of mathematical decisions about the type of conversion of a wide variety of objects.

Furthermore, it is possible that if the object was categorized as type A, the object-based pixel data in step b) is buffered or stored in an internal pixel memory of the programmable system-on-chip and if the object was categorized as type B, the object-based pixel data are buffered or stored in a pixel memory external to the programmable system-on-chip, preferably a cache memory. This further development has the advantage that the external pixel memory is spared in terms of reading and writing processes. As a result, external storage replacement may be required less often, saving time and money. An internal pixel memory of the PSoC is designed so that it does not age with respect to read and write operations, whereas a corresponding external pixel memory can age with respect to read and write operations.

According to a further preferred embodiment, at least one, preferably several, single-instruction-multiple-data-capable or multiple-instruction-multiple-data-capable processors are provided for each of the graphic primitives from the group of graphic primitives rectangle, circle, triangle or line, each of which exclusively includes a predetermined arithmetic operation set tailored to the respective graphical primitive for controlling its or her at least one vector-based arithmetic logic unit, each arithmetic operation set from the group being different from every other arithmetic operation set from the group, wherein according to step b) object-based data, depending on their graphic primitive, are only provided to that or only those processors that include the predetermined set of arithmetic operations tailored to the graphic primitive. This further development offers the advantage that the processing time of the object-based data of an image is extraordinarily reduced if the image comprises at least one or more rectangles and/or circles and/or triangles and/or lines as graphic primitives.

The person skilled in the art is familiar with the corresponding arithmetic operation sets from the prior art in the field of data processing.

According to a particularly preferred embodiment, the single-instruction-multiple-data-capable or multiple-instruction-multiple-data-capable processors are provided, each with at least a first and second vector-based arithmetic logic unit, which were configured such that they are as required are connected in series and during parallel processing according to step b) first several object-based data entering the first arithmetic logic unit in parallel, i.e. simultaneously, each with a bit width of X-bit by using a predetermined first set of calculation operations are transformed into multiple pixel data with a bit width of Y-bit that is larger than the bit width of X-bit which multiple Y-bit pixel data are then by using a predetermined second set of calculation operations transformed into multiple pixel data with a bit width of Z-bit, such width being lager than the bit width of X-bit and preferably as well larger than the bit width of Y-bit, where then the Z-bit pixel data are buffered and stored in the form of a pixel matrix, which consists of an integer number of N-bit pixel data. This further development offers the particular advantage that this offers the possibility to intelligently decrease in an additional manner the processing time of object-based data, which in particular consist of several graphic primitives, in particular which include the graphic primitives rectangle and/or circle and/or triangle and/or line.

The decomposition of the objects into re-vectorized objects according to step g[i]) and the provision of the re-vectorized objects to a predetermined number of processors can be done with a single- or multi-core main processor of the programmable system-on-chip. For the sake of clarity, it is noted that the main processor is not the processor, in particular not the vector processor, of the PSoC.

According to a preferred embodiment of the invention, for each object to be converted from the object group, the computing effort R according to step f) is predicted based on the size and/or the orientation of the object to be converted in the image, which computing effort was preferably stored in a computing effort prediction table.

Furthermore, it is possible for the predetermined value S either to have a constant value or after step e) and before step f) in each conversion cycle based on a freely determined available computing power within the plurality of processors, and preferably based on the size and/or the orientation of one fictitious object to specify a variable value, which is preferably taken from a given conversion mode table. This further development offers the advantage that in the second case the processing time for selected objects, for example a relatively small but relatively complicated object, can be further reduced.

According to a first preferred embodiment of the method, color cards and color profiles are created fully automatically by printing calibration fields of the respective color channels of the second target color space, in particular on waste areas of the print medium or at least some print media, at predetermined time intervals, whereby the printed calibration fields are read in with an image measurement system of the printer, whereby after reading in, preferably by means of a programmable system-on-chip provided, colorimetric calculations are carried out in order to create a new color profile of the first target color space compared to the color profile of the first target color space used by the printer in the process, on the basis of which the conversion according to step b) takes place in such a way that after the new color profile has been created, printing continues immediately on its basis.

This further development offers the advantage that several color cards can be created every day without any operating effort. Color cards are print samples. They can be created for any color, especially for each color channel, of the second color space and serve as a visual reference. Typically, different batches of ink from the same ink brand differ in their coloring and also in their printing properties. So if a colored image is created on a print medium using different batches of ink, you will end up with multiple images of the same pattern, but with different colors. The reasons for this can be, on the one hand, unavoidable inadequacies in the manufacturing process of an ink and, on the other hand, changing properties of the ink as it gets older.

According to an alternative second preferred embodiment of the method, predetermined print patterns of an image printed on a print medium from M-bit print data are read in at predetermined time intervals, preferably by means of artificial intelligence, using an image measuring system of the printer, whereby after reading, preferably by means of a programmable system-on-chip provided for this purpose, colorimetric calculations be carried out in order to create a new color profile of the first target color space compared to the color profile of the first target color space used by the printer in the process, on the basis of which the conversion according to step b) takes place, in such a way that after the creation of the new color profile, printing is continued immediately on its basis.

These further developments offer the advantage that color matching and new creation of color profiles can be done in passing or on the fly and printing ink can also be saved since calibration fields no longer have to be printed.

According to a very preferred embodiment of the method, the first preferred embodiment and the second preferred embodiment are carried out alternately at predetermined time intervals.

According to a further preferred embodiment of the method according to the invention, the programmable system-on-chip is provided with at least one programmable logic circuit which has been configured to carry out weighted addition operations such that when several objects of the object-based data are superimposed in the image, the N-bit color values of the overlapping pixels of each color channel of the multiple objects converted into N-bit pixel data of each color channel are weighted in step b) before buffering or storing in the pixel memory using the programmed logic circuit at the hardware level. These further developments offer the advantage that the storage time of the respective color values of the superimposed pixels of each color channel of several superimposed objects can be extraordinarily reduced.

Furthermore, in the method according to the invention, the programmable system-on-chip can be provided with a further programmable logic circuit which has been configured to carry out the method steps according to step c), in particular the computer-implemented method steps according to step c), in such a way that on the further programmable logical circuit, all steps take place according to step c).

These further developments offer the advantage that this enables an additional improvement in the overall process effectiveness and also the overall system effectiveness in terms of availability, performance and price.

In addition, in this preferred embodiment it is possible for the further programmable logic circuit to carry out a method, in particular a computer-implemented method, configured to compensate for at least one failed or faulty nozzle, in such a way that when after printing on a print medium according to step d), the failed or faulty nozzle is detected with the printer's image measurement system, preferably by means of artificial intelligence, all steps of the method, in particular the computer-implemented method, to compensate for the failed or faulty nozzle take place in the programmable logic circuit.

These further developments offer the advantage that a pixel-nozzle adjustment is made possible in passing or on the fly, so that the continuity of high print quality can be guaranteed.

Methods for compensating for a failed or faulty nozzle are known to the one skilled in the art from the prior art. The basic principle on which such methods operate is to shut down the failed or faulty nozzle and redistribute image data that was to be printed by the failed or faulty nozzle to multiple nozzles located in the vicinity of the failed or faulty nozzle.

The object-based data can be entered into the raster graphics processor in the form of a main queue of several images according to step a), with a display list with several images in several rows intended for the print medium being specified before step b) based on the images from the main queue. This makes it possible to increase the productivity of the printer. The main queue can be created from a plurality of subqueues, each with at least one or more images, using an automated print job system provided in a cloud computing environment, and most preferably using predetermined algorithms.

According to a further preferred embodiment, exclusively object-based data are entered into the raster graphics processor in step a), the underlying image as a whole of which can be processed deterministically in time in all subsequent steps based on the available computing power of the processors, preferably automatically, and particularly preferably by means of artificial intelligence, such that the time required to completely carry out step b) and all subsequent steps except step d) is shorter in total than the time required to completely print the image on at least one print medium. This further development offers the advantage that the risk of a production stop can be significantly reduced or even completely eliminated.

According to a further preferred embodiment, before step a), the image or images are cleaned as required in order to remove object-based data from the image that are not optically relevant to the human eye, such that the object-based data can be processed in a time-deterministic manner in all subsequent steps, wherein the cleanup is preferably carried out at least by filtering with a transparency filter. This further development offers the advantage that a larger number of customer images can usually be processed in a time-deterministic manner.

Furthermore, it is possible for the object-based data to be cleaned automatically using an artificial intelligence, preferably automatically using a continuously learning artificial intelligence, which particularly preferably comprises at least one adaptive decision algorithm on the basis of which the cleaning takes place, and which decision algorithm is based on processing data is adjusted from time to time by artificial intelligence. This further development has the advantage of making it possible to further increase the overall system effectiveness in terms of availability, performance and price.

The printer can be provided as an inkjet printer.

Furthermore, the printer can be provided as a single-pass printer or a multi-pass printer. Preferably the printer is provided as a single-pass inkjet printer or multi-pass inkjet printer. The printer can alternatively be provided as a laser printer or offset printer, for example. If the printer is provided as an inkjet printer, the at least one print medium is printed with ink drops in the color of at least one color channel or in the colors of all color channels of the second target color space based on the M-bit print data.

Step d) can be carried out by printing on a print medium moving in a transport direction or on several print media moving in a transport direction.

According to a very preferred embodiment of the method according to the invention, the vector-based arithmetic logic units were each configured in such a way that during parallel processing according to step b), several object-based data entering the respective arithmetic logic unit in parallel, each with a bit width of X bit, using a predetermined set of calculation operations are, within a single clock cycle of the processor, converted into pixel data with a bit width of Y bit, which is larger than the bit width of X bit, the Y bit pixel data then being buffered or stored in a pixel memory in the form of a pixel matrix consisting of a an integer number of N-bit pixel data.

According to the invention, the object is also achieved by a product, preferably a computer program product, according to claim 22.

The product according to the invention, preferably the computer program product, for synthesizing M-bit print data and providing it to at least one printer, comprises:
A. a raster graphics processor with at least one system-on-chip comprising a plurality of processors, which is designed such that object-based data entered into the raster graphics processor of at least one image in the form of a page description language are converted into N-bit pixel data of each color channel of a first target color space with a predetermined image resolution by providing the object-based data to some or all of the plurality of processors and processing them in parallel with the processors;
B. a dithering computing unit which is designed to convert the N-bit pixel data of each color channel into M-bit print data of each color channel of a second target color space using at least one dithering algorithm and to buffer or store it in an output memory;
C. an output unit designed to provide the M-bit print data to the printer;
D. the at least one printer for printing at least one print medium;
E. wherein each system-on-chip includes a single-core or a multi-core main processor for delegating predetermined tasks, preferably converting the object-based data to N-pixel data, to the processors.

According to the invention, the system-on-chip is designed as a programmable system-on-chip and the processors are designed as single-instruction-multiple-data-capable or multiple-instruction-multiple-data-capable processors, each with at least one vector-based arithmetic logic unit, which vector-based arithmetic logic units are each configured in such a way that when the object-based data is processed in parallel, several object-based data incoming into the respective arithmetic logic unit in parallel, i.e. simultaneously, each with a bit width of X-bit by using a predetermined set of calculation operations are converted in pixel data with a bit width of Y-bit, which is larger than the bit width of X-bit, with the Y-bit pixel data then being converted into a Pixel matrix, which consists of an integer number of N-bit pixel data, is stored or buffered in a pixel memory.

According to a preferred embodiment, the single-instruction-multiple-data-capable or multiple-instruction-multiple-data-capable processors are designed as single-instruction-multiple-data-capable or multiple-instruction-multiple-data-capable vector processors.

A suitable programmable system-on-chip, for example, is a programmable system-on-chip that has recently been commercially marketed by the company Xilinx Inc. as a commercial product under the brand "Adaptive Computer Acceleration Platform", including, for example, the "AI Core Series". "AI Edge Series", the "Prime Series" or the "Premium Series". Such programmable system-on-chips include several hundred integrated vector processors.

According to a further preferred embodiment, the programmable system-on-chip comprises at least one programmable logic circuit configured to perform weighted addition operations such that when multiple objects of the object-based data are superimposed in the image, the N-bit color values of the superimposed ones pixels of each color channel of the multiple objects correspondingly converted into N-bit pixel data of each color channel are weighted added with the programmed logic circuit at the hardware level in step b) before buffering or storing in the pixel memory. These further developments offer the advantage that the storage time of the N-bit data of each color channel from several superimposed objects can be significantly reduced.

The programmable system-on-chip can comprise a single- or multi-core main processor which is configured to decompose an object into re-vectorized objects according to step g[i]) of the method according to the invention. The programmable system-on-chip may also include a high-speed interface for receiving and/or sending data.

The programmable system-on-chip may further comprise a data transfer bus capable of transmitting data at a rate of up to at least 3 Tbit/s, preferably up to 4 Tbit/s, wherein at least the plurality of processors, the pixel memory, the output memory, the at least one programmable logic circuit, the single-core or the multi-core main processor and the high-speed interface are coupled to the data transfer bus.

Furthermore, it is possible for the raster graphics processor to comprise a master processor for executing certain tasks, preferably for delegating certain tasks to the at least one, in particular to the multiple, programmable SoCs.

The printer can be designed as an inkjet printer. The printer can also be designed as a single-pass printer or multi-pass printer. The printer is preferably designed as a single-pass inkjet printer or multi-pass inkjet printer. The printer can alternatively be designed, for example, as a laser printer or offset printer.

In a preferred embodiment, the raster graphics processor is designed in such a way that it can carry out a method according to the invention.

According to a particularly preferred embodiment, the vector-based arithmetic logic units are each configured in such a way that when the object-based data is processed in parallel, several object-based data entering the respective arithmetic logic unit in parallel, each with a bit width of X bit, are converted into pixel data with a bit width of Y-bit using a predetermined set of arithmetic operations in a single clock cycle of the processor, the bit width of Y-bit being larger than the bit width of X-bit, the Y-bit pixel data then being stored in a pixel memory in the form of a pixel matrix consisting of an integer number of N-bit pixel data.

Furthermore, in a preferred embodiment, the dithering computing unit B can be configured as a further programmable logic circuit.

Accordingly, the further programmable logic circuit is configured to convert the N-bit pixel data of each color channel into M-bit print data of each color channel of a second target color space using at least one dithering algorithm and to buffer or store it in an output memory.

This further development offers the advantage that it enables an additional improvement in the overall process effectiveness and also the overall system effectiveness in terms of availability, performance and price.

In addition, in this preferred embodiment it is possible for the further programmable logic circuit to be used to carry out a method, in particular a computer-implemented method, to compensate for at least one failed or faulty nozzle is configured in such a way that if after printing on a print medium according to step d), the failed or faulty nozzle is detected, preferably by means of artificial intelligence, with the image measuring system of the printer on the programmable logic circuit all steps of the method, in particular of the computer-implemented procedure can run to compensate for the failed or faulty nozzle.

This further development offers the advantage that it enables nozzle adjustment in passing or on the fly, so that the continuity of high print quality can be guaranteed.

The invention claimed is:

1. A method for synthesizing M-bit print data and for providing the same to at least one printer, comprising:
   a) inputting object-based data of at least one image in the form of a page description language into a raster graphics processor with at least one system-on-chip comprising several processors;
   b) converting the object-based data into N-bit pixel data of each color channel of a first target color space with a specified image resolution by providing the object-based data to some or all of the plurality of processors and processing them in parallel with the processors;
   c) converting the N-bit pixel data of each color channel into M-bit print data of each color channel of a second target color space with at least one dithering algorithm and buffering or storing the M-bit print data in an output memory;
   d) providing the M-bit print data to the at least one printer and printing on at least one print medium with the printer;
   characterized in that the system-on-chip is provided as a programmable system-on-chip and the processors are provided as single-instruction-multiple-data-capable or multiple-instruction-multiple-data-capable processors, each with at least one vector-based arithmetic logic unit which vector-based arithmetic logic units have each been configured in such a way that during parallel processing according to step b), several object-based data entering the respective arithmetic logic unit in parallel, each with a bit width of X bit, using a predetermined set of calculation operations are converted into pixel data with a bit width of Y bit, which is larger than the bit width of X bit,
   the Y bit pixel data then being buffered or stored in a pixel memory in the form of a pixel matrix consisting of an integer number of N-bit pixel data.

2. The method according to claim 1, wherein the single instruction multiple data capable or multiple instruction multiple data capable processors are single instruction multiple data capable or multiple instruction multiple data capable vector processors to be provided.

3. The method according to claim 1, wherein the object-based data comprise object-based PDF data and/or object-based PostScript data, each in the form of a vector-based page description language.

4. The method according to claim 1, wherein a subtractive color space is specified as the first target color space, which preferably comprises at least the color channels cyan (C), magenta red (M), yellow (Y) and black (K) and as the second target space subtractive color space is specified, which preferably comprises at least the color channels cyan (C), magenta red (M), yellow (Y) and black (K), and which in particular comprises at least one of the color channels of a predetermined green and/or violet and/or orange.

5. The method according to claim 1, wherein the N-bit pixel data have a bit width of 8-/9-/10-/11-/12-/13-/14-/15- or 16-bit, preferably a bit width of 8-/16-/32- or 64 bit, in particular a bit width of 8 bits, and the M-bit print data have a bit width of 1-/2-/3- or 4 bit.

6. The method according to claim 1, wherein the X-bit pixel data have a bit width of 8-/16-/32- or 64-bit, preferably of 8-bit and the Y-bit print data have a bit width of 16-/32-/64-/128-/256-/512-/1024-/2048 or 4096-bit, preferably 128-/256-/512-/1024-/2048 or 4096-bit.

7. The method according to claim 1, wherein the raster graphics processor has been equipped with the conversion modes R1 and R2, the conversion according to step b) taking place in one or more conversion cycles, a conversion cycle comprising the steps:
   e) determining an object group of objects of the image to be converted based on the conversion progress;
   f) determining the computing effort R for each object from the object group in order to predict whether the corresponding required computing effort R exceeds a predetermined value S or falls below the value S, and categorizing the respective objects into type A if the computing effort falls below the value S, and in type B, if the computational effort exceeds the value S;
   g) starting the conversion by
      i. if the object was categorized as type A, mode R1 is selected and the object is broken down into several independent re-vectorized objects according to mode R1 and the re-vectorized objects are provided to a predeterminable number of processors and with the processors according to step b) converted which re-vectorized objects are partial objects of the object, which together form the object;
      ii. if the object has been categorized as type B, mode R2 is selected and the object is converted according to mode R2 without being broken down into several independent re-vectorized objects according to step b).

8. The method according to claim 7, wherein if the object was categorized as type A, the object-based pixel data in step b) are buffered or stored in an internal pixel memory of the programmable system-on-chip and if the object was categorized as type B, the object-based pixel data are buffered or stored in a pixel memory external to the programmable system-on-chip, preferably a cache memory.

9. The method according to claim 7, wherein that for the predetermined value S either a constant value or after step e) and before step f) in each conversion cycle based on a freely determined available computing power within the plurality of processors, and preferably based on the size and/or the orientation of a fictitious object, a variable value is specified, which is preferably taken from a specified conversion mode table.

10. The method according to claim 7, wherein the breakdown of the objects into re-vectorized objects according to step (g[i]) and provision of the re-vectorized objects to a predeterminable number of processors with a single or multi-core main processor of the programmable system-on-chip takes place.

11. The method according to claim 7, wherein for each object to be converted from the object group, the computing effort R according to step f) is predicted based on the size and/or the orientation of the respective object to be converted in the image, which computing effort was preferably stored in a calculation effort prediction table.

12. The method according to claim 1, wherein each of the graphic primitives from the group of graphic primitives rectangle, circle, triangle or line at least one, preferably several single-instruction-multiple-data-capable or multiple-instruction-multiple-data-capable processors are provided, each of which exclusively include a predetermined set of arithmetic operations tailored to the respective graphical primitive to control his or their at least one vector-based arithmetic logic unit, whereby each set of arithmetic operations from the group differs from every other set of arithmetic operations from the group, wherein according to step b) the object-based data, depending on their graphical primitive, are only provided to that or only those processors which comprise the predetermined set of arithmetic operations coordinated with the graphical primitive.

13. The method according to claim 1, wherein the single-instruction-multiple-data-capable or multiple-instruction-multiple-data-capable processors are provided with at least one first and second vector-based arithmetic logic unit, which were configured, in such a way that they are connected in series as required and during parallel processing according to step b) initially several object-based data entering the first arithmetic logic unit in parallel, each with a bit width of X bit, are transformed, using a predetermined first set of arithmetic operations, into several pixel data with a bit width of Y-bit, which is larger than the bit width of X-bit, which multiple Y-bit pixel data are then by using a predetermined second set of calculation operations transformed into multiple pixel data with a bit width of Z-bit, such width being lager than the bit width of X-bit and preferably as well larger than the bit width of Y-bit, where then the Z-bit pixel data are buffered and stored in the form of a pixel matrix, which consists of an integer number of N-bit pixel data.

14. The method according to claim 1 further comprising the steps that color maps and color profiles are created fully automatically by printing calibration fields of the respective color channels of the second target color space, in particular on waste areas of the print medium or at least some print media, at predetermined time intervals, which are read in with an image measuring system of the printer, whereby after reading, colorimetric calculations are carried out, preferably by means of a dedicated programmable system-on-chip, in order to create a new color profile of the first target color space compared to the color profile of the first target color space used by the printer in the process on which basis the conversion according to step b) follows, in such a way that after the new color profile has been created, printing continues immediately on its basis.

15. The method according to claim 1, wherein the programmable system-on-chip is provided with at least one programmable logic circuit which is used to execute weighted addition operations have been configured in such a way that if several objects of the object-based data are superimposed in the image, the N-bit color values of the overlapping pixels of each color channel of the multiple objects converted into N-bit pixel data of each color channel are added in a weighted manner in step b) using the programmed logic circuit at the hardware level before buffering or storing in the pixel memory.

16. The method according to claim 7, according to step a) exclusively object-based data are entered into the raster graphics processor, where the underlying image as a whole in all subsequent steps based on the available computing power of the processors can be processed deterministically in time, preferably automatically, and particularly preferably by means of artificial intelligence, such that the time required to completely carry out step b) and all subsequent steps except step d) is shorter in total than the time required to completely print the image on the at least one print medium.

17. The method according to claim 16, wherein before step a) a cleaning of the image or images is carried out as required in order to remove object-based data from the image that are optically irrelevant to the human eye, such that the object-based data can be processed in a time-deterministic manner in all subsequent steps, wherein the cleanup is preferably carried out at least by filtering with a transparency filter.

18. The method according to claim 17, wherein the cleaning of the object-based data is carried out automatically by means of an artificial intelligence, preferably automated by means of a continuously learning artificial intelligence, which particularly preferably comprises at least one adaptive decision algorithm on the basis of which the cleaning takes place, and which decision algorithm is based on of processing data is adjusted from time to time by artificial intelligence.

19. The method according to claim 1, wherein the printer is provided as an inkjet printer, preferably as a single-pass inkjet printer or multi-pass inkjet printer.

20. The method according to claim 1, wherein step d) is carried out by printing on a print medium moving in a transport direction or on several print media moving in a transport direction.

21. The method according to claim 1, wherein the printer was provided as an inkjet printer.

22. The method according to claim 1, wherein the vector-based arithmetic logic units were each configured in such a way that during parallel processing according to step b), several object-based data entering the respective arithmetic logic unit in parallel, each with a bit width of X-bits by applying a predetermined set of arithmetic operations in a single clock cycle of the processor is converted into pixel data with a bit width of Y bit, which is larger than the bit width of X bit, the Y bit pixel data then being buffered and stored in a pixel memory in form of a pixel matrix consisting of an integer Number of N-bit pixel data.

23. The method according to claim 14 further comprising by the steps that predetermined print patterns of an image printed on a print medium from M-bit print data are read in fully automatically at predetermined time intervals, preferably by means of artificial intelligence, with an image measuring system of the printer, where after reading, preferably by means of a programmable system-on-chip provided for this purpose, colorimetric calculations are carried out in order to create a new color profile of the first target color space compared to the color profile of the first target color space used by the printer in the process, on the basis of which the conversion according to step b) takes place, in such a way that after the new color profile has been created, printing continues immediately based on it.

24. The method according to claim 23, wherein the steps are carried out alternately at predetermined time intervals.

25. The method according to claim 1, wherein the programmable system-on-chip is provided with a further programmable logic circuit which has been configured to carry out the method steps according to step c), in particular the computer-implemented method steps according to step c), in such a way that all steps according to step c) take place on the further programmable logic circuit.

26. The method according to claim 25, wherein the further programmable logic circuit for executing a method, in particular a computer-implemented method, for compensating for at least one failed or faulty nozzle was configured in such a way that if after printing on a print medium according to step d), the failed or faulty nozzle is detected, preferably by means of artificial intelligence, with the image measuring system of the printer, all steps of the method, in particular the computer-implemented method, for compensating for the failed or faulty nozzle take place on the programmable logic circuit.

27. A product, in particular computer program product, for synthesizing M-bit print data and providing it to at least one printer, comprising:
   A. a raster graphics processor with at least one system-on-chip comprising a plurality of processors, which is designed such that object-based data entered into the raster graphics processor of at least one image in the form of a page description language are converted into N-bit pixel data of each color channel of a first target color space with a predetermined image resolution by providing the object-based data to some or all of the plurality of processors and processing them in parallel with the processors;
   B. a dithering computing unit which is designed to convert the N-bit pixel data of each color channel into M-bit print data of each color channel of a second target color space using at least one dithering algorithm and to store it in an output memory;
   C. an output unit designed to provide the M-bit print data to the printer;
   D. the at least one printer for printing at least one print medium;
   E. wherein each system-on-chip comprises a single-core or a multi-core main processor for delegating predetermined tasks, preferably converting the object-based data to N-pixel data, to the processors,
   characterized in that the system-on-chip is designed as a programmable system-on-chip and the processors are designed as single-instruction-multiple-data-capable or multiple-instruction-multiple-data-capable processors, each with at least one vector-based arithmetic logic unit, which vector-based arithmetic logic units are each configured, in such a way that when the object-based data is processed in parallel, several object-based data entering the respective arithmetic logic unit in parallel, each with a bit width of X bit using a predetermined one the processor's arithmetic operation set is converted into pixel data with a bit width of Y bit, which is larger than the bit width of X bit, the Y bit pixel data then being stored in a pixel memory in the form of a pixel matrix which consists of an integer number of N bit pixel data.

28. The product to claim 27, according wherein the single instruction multiple data capable or multiple instruction multiple data capable processors are designed as single-instruction-multiple-data capable or multiple-instruction-multiple-data capable vector processors.

29. The product according to claim 27, wherein the programmable system-on-chip comprises at least one programmable logic circuit configured to perform weighted addition operations such that when multiple objects of the object-based data are superimposed in the image, the N-Bit color values of the overlapping pixels of each color channel of the multiple objects converted into N-bit pixel data of each color channel are added in a weighted manner in step b) using the programmed logic circuit at the hardware level before buffering or storing in the pixel memory.

30. The product according to claim 27, wherein the printer is designed as an inkjet printer, preferably as a single-pass inkjet printer or multi-pass inkjet printer.

31. The product according to claim 27, wherein the raster graphics processor is designed such that it can carry out a method according to at least one of claims 3 to 26.

32. The product according to claim 27, wherein the vector-based arithmetic logic units are each configured in such a way that when the object-based data are processed in parallel, several object-based data entering the respective arithmetic logic unit in parallel, each with a bit width of X bit using a predetermined one the processor's arithmetic operation set is converted in a single clock cycle of the processor into pixel data with a bit width of Y bit, which is larger than the bit width of X bit, the Y bit pixel data then being stored in a pixel memory in the form of a pixel matrix which consists of an integer number of N bit pixel data.

33. The product according to claim 27, wherein the dithering computing unit B is configured as a further programmable logic circuit.

34. The product according to claim 33, wherein the further programmable logic circuit is configured to carry out a method, in particular a computer-implemented method, for compensating for at least one failed or faulty nozzle, such that if after printing on a print medium according to step d), the failed or faulty nozzle is detected, preferably by means of artificial intelligence, with the image measuring system of the printer, all steps of the method, in particular the computer-implemented method for compensating the failed or faulty nozzle can take place on the programmable logic circuit.

* * * * *